United States Patent
Dutta (10) Patent No.: US 6,684,254 B1
(45) Date of Patent: Jan. 27, 2004

(54) HYPERLINK FILTER FOR "PIRATED" AND "DISPUTED" COPYRIGHT MATERIAL ON THE INTERNET IN A METHOD, SYSTEM AND PROGRAM (75) Inventor: Rabindranath Dutta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 773 days.

(21) Appl. No.: 09/583,345

(22) Filed: May 31, 2000

(51) Int. Cl.[7] .......................... G06F 15/16; H04N 7/167
(52) U.S. Cl. ...................................... 709/229; 380/201
(58) Field of Search ............................... 709/229, 225; 713/200; 380/201

(56) References Cited

U.S. PATENT DOCUMENTS

| | | | |
|---|---|---|---|
| 4,584,641 A | 4/1986 | Guglielmino | |
| 5,572,643 A | 11/1996 | Judson | |
| 5,706,507 A | 1/1998 | Schloss | |
| 5,754,864 A | 5/1998 | Hill | |
| 5,765,152 A * | 6/1998 | Erickson | 707/9 |
| 5,805,699 A | 9/1998 | Akiyama et al. | 380/4 |
| 5,818,933 A | 10/1998 | Kambe et al. | 380/4 |
| 5,842,225 A | 11/1998 | Kohn | 711/202 |
| 5,895,471 A * | 4/1999 | King et al. | 707/104.1 |
| 5,983,351 A | 11/1999 | Glogau | 713/201 |
| 6,009,459 A * | 12/1999 | Belfiore et al. | 709/203 |
| 6,112,202 A * | 8/2000 | Kleinberg | 707/5 |
| 6,211,871 B1 * | 4/2001 | Himmel et al. | 345/744 |
| 6,233,618 B1 * | 5/2001 | Shannon | 709/229 |
| 6,401,118 B1 * | 6/2002 | Thomas | 709/224 |
| 6,615,266 B1 * | 9/2003 | Hoffman et al. | 709/227 |

* cited by examiner

Primary Examiner—Krisna Lim
(74) Attorney, Agent, or Firm—Marilyn Smith Dawkins Bracewell & Patterson, L.L.P.

(57) ABSTRACT

A central repository server contains a reference list of Uniform Resource Locators (URLs) for copyright infringing or disputed material located on the Internet, with an indication of whether the material is categorized as infringing or disputed. A filter/transcode program operates with the reference list to test content for infringing links, comparing the URLs for links within the content to those within the reference list. When a match is determined, the category of the link within the reference list is checked. If the link is an infringing link, the filter/transcode program may automatically remove the link from the content. If the link is disputed, the filter/transcode program may modify the link to include a warning that the link may be directed to infringing material. Comments may be added to the tested content by the filter/transcode program to certify the test results. Additions to the reference list may be submitted by the copyright owner, subject to verification. Initial classification of links as disputed until infringement can be verified allow the reference list to be considered reliable by content builders and publishers.

28 Claims, 4 Drawing Sheets

HYPERLINK FILTER FOR "PIRATED" AND "DISPUTED" COPYRIGHT MATERIAL ON THE INTERNET IN A METHOD, SYSTEM AND PROGRAM

BACKGROUND OF THE INVENTION

1. Technical Field

The present invention generally relates to identifying copyright infringing content on the Internet and in particular to identifying such material for both copyright owners and content builders. Still more particularly, the present invention relates to identifying copyright infringing content on the Internet through publicly accessible lists of addresses for such content.

2. Description of the Related Art

Copyright laws, due to the explosion of Internet access, are undergoing new interpretations and developments in policing copyright infringement. The Digital Millennium Copyright Act of 1998, for example, makes it illegal for a person to knowingly "link" (provide a hyperlink to) infringing or "pirated" copyrighted material. Examples of copyrighted material which might be illegally copied and/or linked to include text, music, graphics, audio and videos, and any type of document or original work. Search engines are exempt from liability for linking to illegal material since there is no easy way to determine if the content is illegal.

On the Internet, if pirated material is in a Web server located physically within the United States, the copyright owner can legally cause the contents to be removed from the server. Hyperlinks to the offending material are then rendered useless and irrelevant. However, when the server on which pirated material is located is outside the jurisdiction of the United States, there exists no easy copyright enforcement mechanism since there exists no universal copyright law with respect to the Internet. Policing Internet material worldwide is therefore difficult when the pirated content originates outside the United States and only links to such content are located within a server in the United States. Additionally, other countries may have similar copyright provisions.

A common method for locating infringing material is to use search engines that locate content, such as key words, present in the original copyrighted work. Web site content builders, the most likely candidates to infringe copyrighted material, typically do not intentionally violate copyrights by linking to copyrighted material because of the time, trouble and cost involved to correct a disputed link. Additionally, the potential for infringement lawsuits is a significant deterrent.

It would be desirable, therefore, to allow content builders for Web sites to determine whether material being considered for hyperlinking is illegally copied, or at least in dispute. It would also be desirable to provide a method, system and program to alert both copyright holders and content builders of pirated material.

SUMMARY OF THE INVENTION

It is therefore one object of the present invention to provide a method, system and program for identifying copyright infringing content on the Internet.

It is another object of the present invention to provide a method, system and program for identifying copyright infringing content on the Internet for both copyright owners and content builders.

It is yet another object of the present invention to provide a method, system and program for identifying copyright infringing content on the Internet through publicly accessible lists of addresses for such content.

The foregoing objects are achieved as is now described. A central repository server contains a reference list of Uniform Resource Locators (URLs) for copyright infringing or disputed material located on the Internet, with an indication of whether the material is categorized as infringing or disputed. A filter/transcode program operates with the reference list to test content for infringing links, comparing the URLs for links within the content to those within the reference list. When a match is determined, the category of the link within the reference list is checked. If the link is an infringing link, the filter/transcode program may automatically remove the link from the content. If the link is disputed, the filter/transcode program may modify the link to include a warning that the link may be directed to infringing material. Comments may be added to the tested content by the filter/transcode program to certify the test results. Additions to the reference list may be submitted by the copyright owner, subject to verification. Initial classification of links as disputed until infringement can be verified to allow the reference list to be considered reliable by content builders and publishers.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
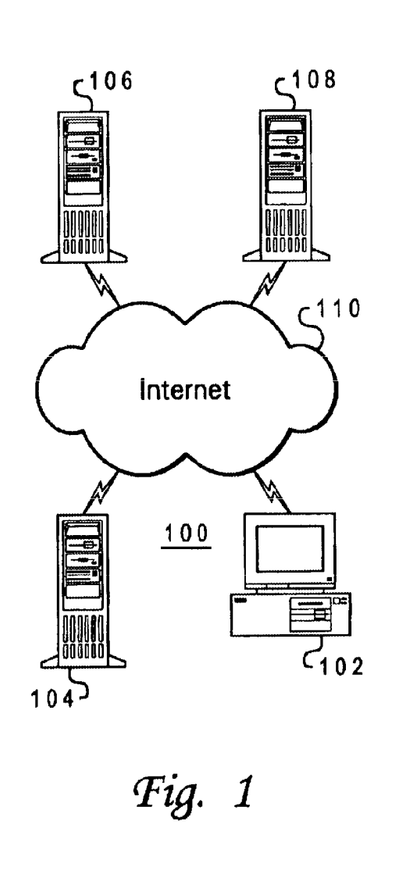
FIG. 1 depicts a high-level block diagram of a data processing system network in which a preferred embodiment of the present invention may be implemented.

With reference now to the figures, and in particular with reference to FIG. 1, a high-level block diagram of a data processing system network in which a preferred embodiment of the present invention may be implemented is depicted. System 100 includes a client system 102 and a number of server systems 104, 106 and 108 operatively connected via the Internet 110. Client 102 and servers 104, 106 and 108 communicate and exchange data including HyperText Markup Language (HTML) documents using the HyperText Transfer Protocol (HTTP) in accordance with the known art.

In the example depicted, client 102 is employed by a Web site content builder to create content for a Web site. The content created includes links to selected content on servers 104 and 106 in the form of hypertext references to the Uniform Resource Locator (URL) Internet address of the selected content. In the exemplary embodiment, server 108 is a "repository" server, a publicly accessible server containing a list or database of infringing or disputed copyright content, identified by the URL of content.

Figure 2:
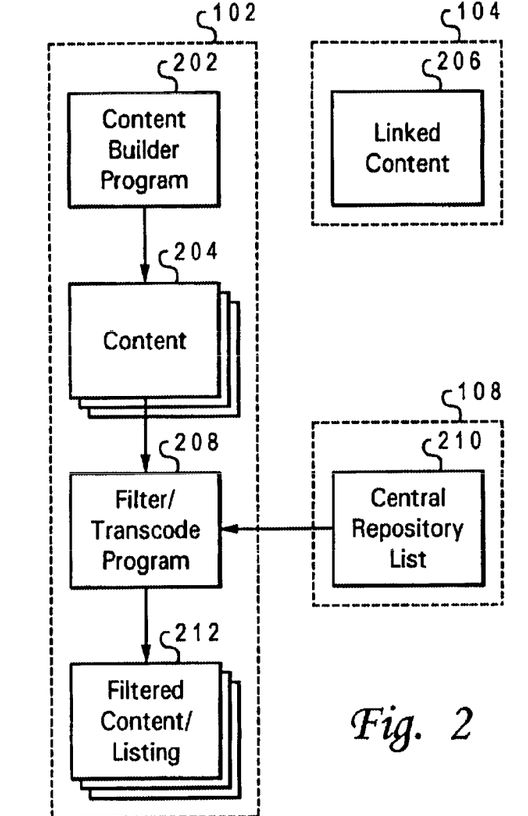
FIG. 2 is a block diagram of components employed in checking hyperlinks within content for links to pirated or disputed material in accordance with a preferred embodiment of the present invention.

Referring to FIG. 2, which is intended to be read in conjunction with FIG. 1, a block diagram of components employed in checking hyperlinks within content for links to pirated or disputed material in accordance with a preferred embodiment of the present invention is illustrated. In the present invention, builder program 202 within client 102 is utilized to create Internet content 204, including hyperlinks to content on server 104 (or 106) in the form of HTML HREF statements containing the URL address of the linked content 206. The content 204, at any time during development but preferably upon completion, is then tested by filter/transcode program 208 for links to pirated or disputed content.

In testing content 204, filter/transcode program 208 connects to repository or reference server 108, which contains a list 210 of URLs of pirated or disputed content. List 210 may be compiled and maintained by an independent aggregator, with inclusion of URLs controlled by a defined standard and with different levels of inclusion. In the exemplary embodiment, at least two levels of inclusion are contemplated: one for infringing material and one for disputed material. Where a large number of cases are contested, having such multiple levels of inclusion within infringing/disputed content list 210 would be useful.

Filter/transcode program 208 compares URLs within the content 204 created for publication to the URLs within the infringing/disputed content list 210. Where no match for an URL within content 204 is found in list 210, that URL is left undisturbed. If a match is identified between an URL within content 204 and those within list 210, however, the matched URL is either filtered or transcoded, or the content builder is notified.

In the exemplary embodiment, which supports two separate levels of inclusion for infringing and disputed content, the matched URL is automatically removed from content 204 for links to infringing content. The URL is transcoded within content 204 for links to disputed content. Links to disputed content are modified to include a warning that the links may lead to unauthorized copies of copyrighted content.

Filter/transcode program 208 processes the entire text of content 204 testing for links to infringing or disputed content. Links within content 204 which do not match any URLs within list 210 remain unchanged, while matching links within content 204 are automatically filtered or transcoded to produce filtered content 212. Alternatively, content 204 may be left unchanged and a listing of links found within content 204 which match an URL within list 210 may be generated for the content builder, with or without an indication of whether the link leads to infringing or merely disputed content. Clearance statements for unmatching links may also be included within such a listing, which may be inserted within content 204 as a section of HTML comments. Both automatic filtration or transcoding of links and generation of an HTML comment listing of the links altered and/or cleared (with, e.g., a date of testing and a checksum for the content tested) may also be employed.

Filter/transcode program 208 is preferably provided by the independent aggregator of list 210, or developed in conjunction with the aggregator to ensure reliability of testing results. Tested content may be provided with certification data as described above to ensure that a subsequent determination that an URL within the content links to infringing data—but not known at the time of testing to link to infringing data—does not expose the content builder or publisher to liability.

With the present invention, a content builder may access the repository or reference server to determine whether an URL hyperlink in a Web page references infringing material. If the referenced material is not known to the repository server to contain infringing or disputed material, the content builder may be notified of that fact. If an offending link is discovered, on the other hand, the content builder has an option to include the link or refrain from including the link within the content. Most content builders will refrain from including links to infringing materials.

Figure 3A:
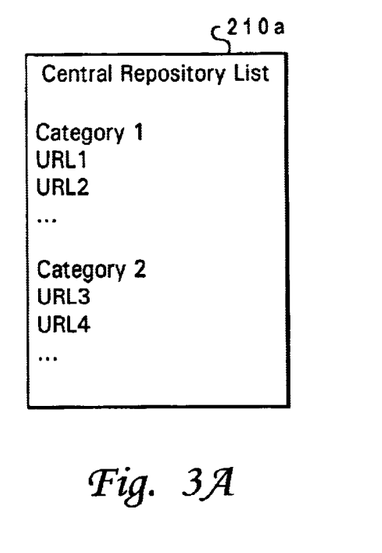
FIGS. 3A–3B depict alternative structures for an infringing/disputed content listing employed in testing links in accordance with a preferred embodiment of the present invention.
Figure 3B:
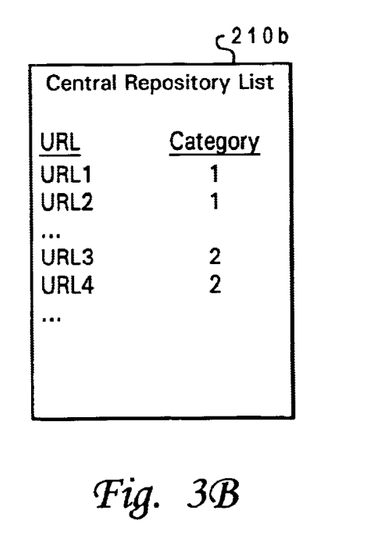

With reference now to FIGS. 3A and 3B, alternative structures for an infringing/disputed content listing employed in testing links in accordance with a preferred embodiment of the present invention are depicted. URLs within the list of infringing/disputed content maintained by the independent aggregator at the reference or repository server may be segregated by category (i.e., infringing content versus disputed content), or may be a field within a series of records each including an indication of the applicable category, together with other information such as the date the URL was identified at linking to infringing or disputed material.

FIG. 3A depicts a list 210*a* employing the first logical structure, while FIG. 3B depicts a list 210*b* employing the second logical organization. With either organization, the reference list is preferably designed to expedite comparison of large numbers of URLs (e.g., alphabetically ordered by domain name, then path, filename and extension, etc.).

Figure 4:
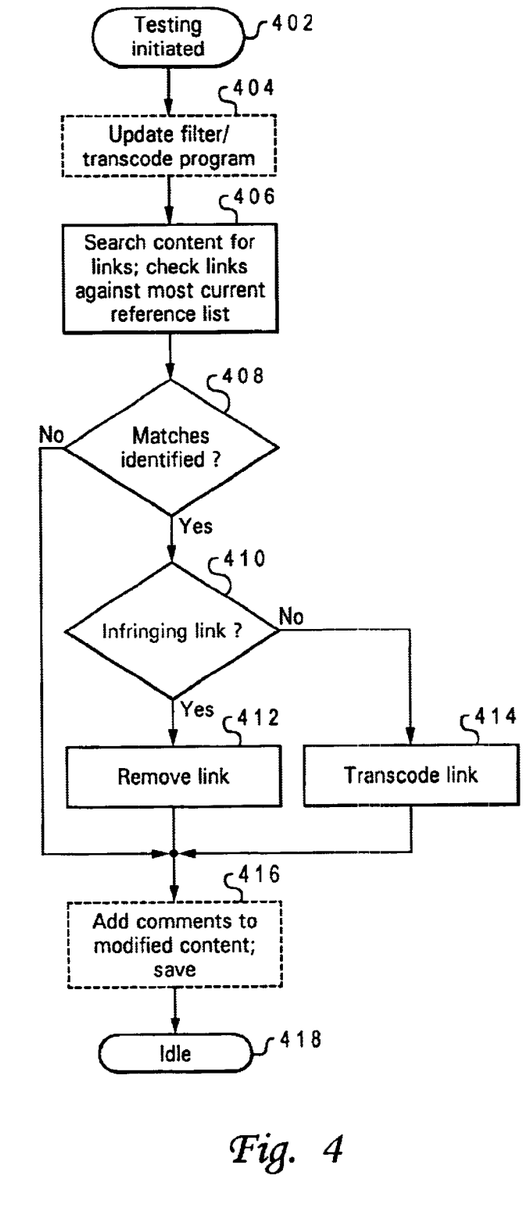
FIG. 4 depicts a high level flow chart for a process of testing content for links to infringing or disputed material in accordance with a preferred embodiment of the present invention.

Referring to FIG. 4, a high level flow chart for a process of testing content for links to infringing or disputed material in accordance with a preferred embodiment of the present invention is illustrated. The process begins at step 402, which depicts the content builder initiating testing of completed content just prior to publication. The process may first pass to optional step 404, which illustrates downloading the most recent version of the filter/transcode program, if necessary. As noted above, filter/transcode program is preferably available at the reference server and may require period updates or modifications.

The process then passes to step 406, which depicts the filter/transcode programs searching the content to be tested for links (e.g., HTML HREF or SRC statements, or URLs within the content) and checking the links against the most current reference list of infringing or disputed URLs. Any of several different strategies may be employed for this step. Links may be individually tested when located within the content, or a list of all links within the content may be compiled for batch processing. The reference list may be copied from the reference server and comparisons made locally within the content builders system, or the links may be transmitted to the reference server so that the comparisons may be made at the server.

The process then passes to step 408, which illustrates a determination of whether matches were found between links within the content being tested and URLs within the reference list of infringing or disputed material. If so, the process proceeds to step 410, which depicts a determination of the category of the matching link—that is, whether the link contains the address of infringing material, disputed material, or some other category of material. If the link is identified as relating to infringing material, the process proceeds to step 412, which illustrates removing the link from the content being tested, or disabling the link within the content (e.g., by simply deleting the URL, but not the remainder of the HREF or SRC statement). If the link is identified as relating to merely disputed material, however, the process proceeds instead to step 414, which depicts transcoding the link to incorporate a warning regarding the disputed nature of the material.

Rather than automatically filtering or transcoding the links, a listing of the problematic links within the material may be compiled by the filter/transcode program, together with an indication for each of whether the referenced material is infringing or disputed. The content builder may then modify the links as deemed appropriate. However, from a legal liability perspective, automatic correction of infringing links would be preferable for certification of the content as "clean."

From either of steps 412 or 414, or from step 408 if no matching links were identified, the process may then pass to optional step 416, which illustrates adding HTML comments to the tested content certifying that the content is free of infringing links. The comments may include, for example, a date on which the content was tested, a version of the reference list employed in testing the content, a checksum or other electronic signature for the tested content, a listing of removed or altered links and/or "cleared" links, and a unique code which may be subsequently used to authenticate or verify the certification by the reference server. From step 416, the process then passes to step 418. which depicts the process becoming idle until content testing is again initiated.

Figure 5A:
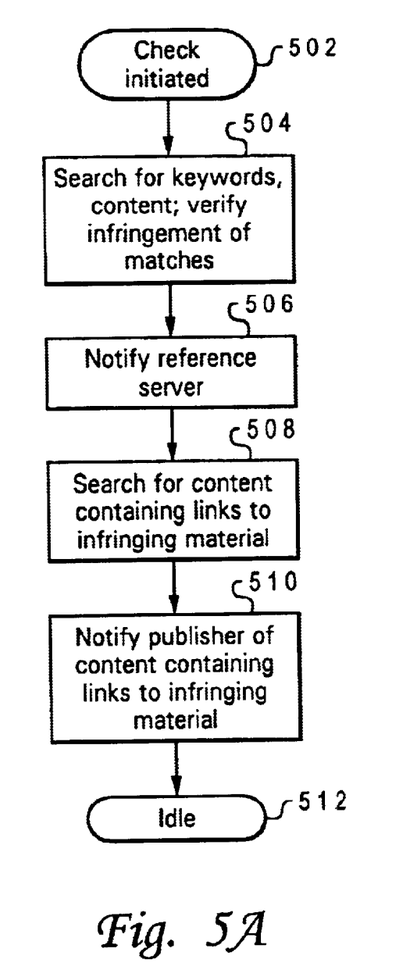
FIGS. 5A–5B depict high level flow charts for processes of adding URLs for infringing materials to the reference list in accordance with a preferred embodiment of the present invention.
Figure 5B:
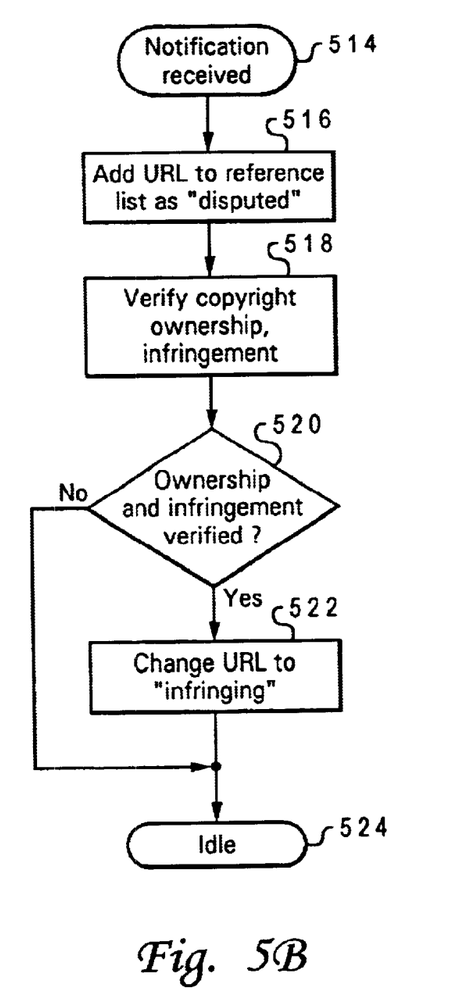

With reference now to FIGS. 5A and 5B, high level flow charts for processes of adding URLs for infringing materials to the reference list in accordance with a preferred embodiment of the present invention is depicted. In the present invention, copyright owners which locate infringing materials may submit the URL for the infringing content to the reference server for addition to the reference list, then directly notify the publishers of content containing links to the infringing materials.

FIG. 5A depicts the process for copyright owners in locating infringing material and notifying the reference server. The process begins at step 502, which depicts a check for infringing materials on the Internet being initiated. The check is made by utilizing a search engine to locate unique keywords from text content or encoded electronic signatures or other unique identifiers from graphic, video, or audio content in published content. The process then passes to step 504, which illustrates initiating a search for the keywords and identifiers and, upon matches being identified by the search engine, verifying infringement by comparison of the located material with the copyrighted work.

If infringing material is located, the process then passes to step 506, which depicts notifying the reference server of the infringing material, identified by the URL of the infringing content. The process next passes to step 508, which illustrates searching for published content containing a link to the infringing content. Such searching must be performed on is the HTML source of published content, examining links within the published content for URLs matching that of the infringing material.

If an infringing link (a link to the infringing material) is found, the process passes to step 510, which depicts notifying the publisher of the content containing the infringing link. The Webmaster of the site containing the infringing link may be notified, with an identification of the infringing link by the filename containing the infringing link and the URL of the infringing content. The process then passes to step 512, which illustrates the process becoming idle until another check for infringing material and infringing links is initiated by the copyright owner.

FIG. 5B depicts the process of the reference server in adding a link to the reference list of infringing and disputed links. The process begins at step 514, which depicts the reference server receiving the notification from the copyright owner (step 506) of the infringing content, identified by the URL for the infringing material. While the link may be simply added to the reference list based on the copyright owners allegation of infringement, with appropriate disclaimers, the value of the reference list is derived from certainty that the content infringes a copyright. Without verification of copyright ownership and infringement to prevent baseless allegations of infringement, content publishers are unlikely to be motivated to employ the reference server. In the present invention, therefore, the URL received from the copyright owner is initially added to the reference list as "disputed."

The process thus passes to step 516, which illustrates adding the received URL to the reference list as a "disputed" link. The process then passes to step 518, which depicts verifying copyright ownership and infringement. Copyright ownership may be verified, for example, by requiring the copyright owner to supply a copy of the copyright registration or registration application. Infringement, on the other hand, requires determinations of similarity, fair use, and other factors not addressed here. The process thus passes to step 520, which illustrates a determination of whether copyright ownership and infringement have been verified for the URL submitted by the copyright owner.

If copyright ownership and infringement may be verified, the process proceeds to step 522, which illustrates changing the categorization of the URL within the reference list to "infringing." The copyright owner may optionally be notified of the change of the URLs categorization within the reference list. If either copyright ownership or infringement may not be verified to some reasonable degree of certainty, however, the URL remains categorized within the reference list as "disputed." The process then passes to step 524, which depicts the process becoming idle until another notification of infringing content is received from a copyright owner.

Figure 6:
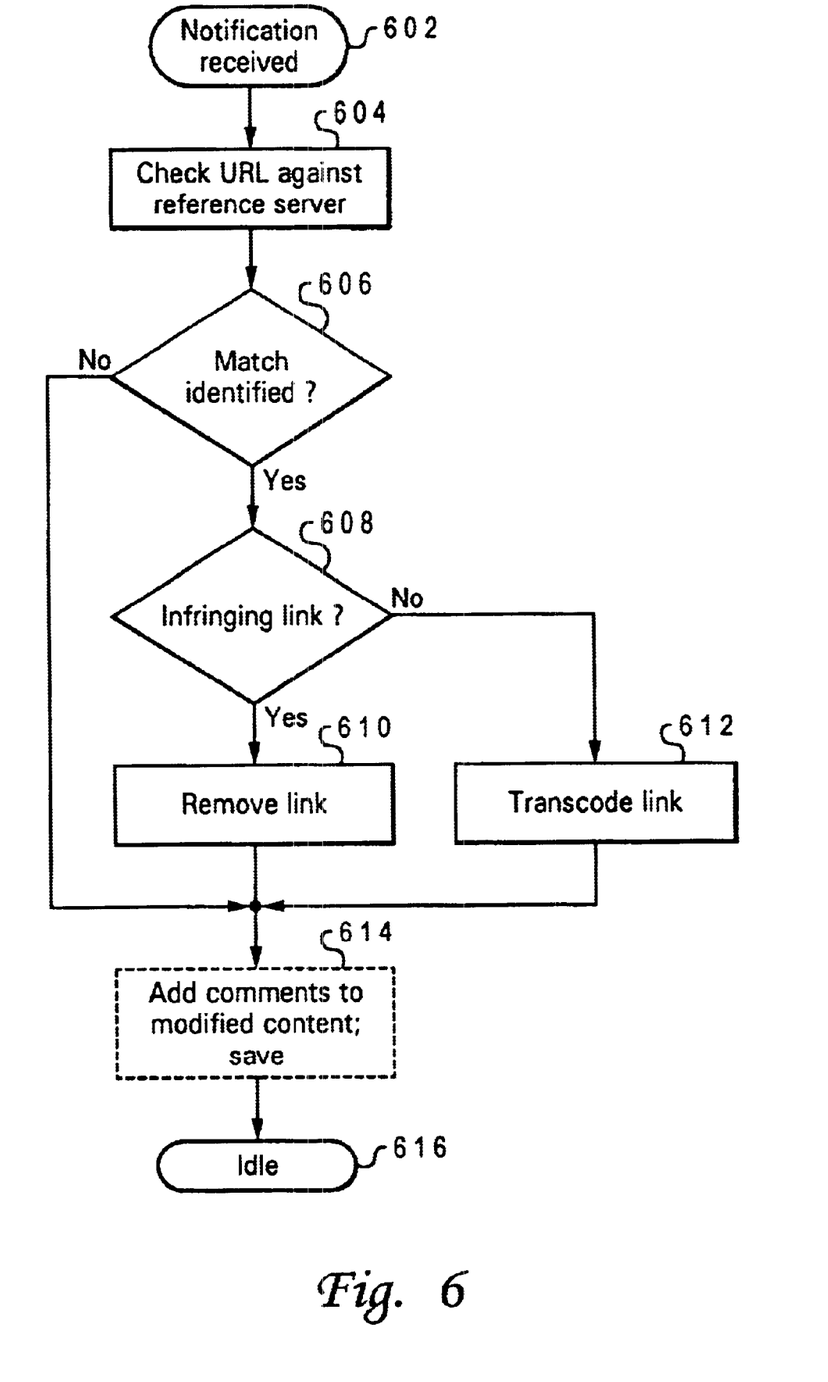
FIG. 6 is a high level flow chart for a process of testing links for infringement in response to a notice from the copyright owner in accordance with a preferred embodiment of the present invention.

Referring to FIG. 6, a high level flow chart for a process of testing links for infringement in response to a notice from the copyright owner in accordance with a preferred embodiment of the present invention is illustrated. If a notification is received by a content publisher from a copyright owner (step 510 in FIG. 5A) of an infringing link within the publisher's content, the publisher may employ filter/transcode program to remove or modify the infringing links. The process begins at step 602, which illustrates the publisher receiving notice from the copyright owner of the infringing nature of links within the publisher's content. The notice should preferably contain an identification of the filenames containing the infringing links and the URLs for the infringing links.

The process first passes to step 604, which depicts checking the URL(s) received from the copyright owner against those within the reference list. The process then passes to step 606, which illustrates a determination of whether matches were found between the URL(s) received from the copyright owner and URLs within the reference list of infringing or disputed material. If so, the process proceeds to step 608, which depicts a determination whether the link is categorized in the reference list as infringing or disputed.

If the link is identified as relating to infringing material, the process proceeds to step 610, which illustrates removing (or disabling) the link from the publisher's content. If the link is identified as relating to merely disputed material, however, the process proceeds instead to step 612, which depicts transcoding the link to incorporate a warning regarding the disputed nature of the material. From either of steps 610 or 612, or from step 606 if no match for the URL supplied by the copyright owner is identified within the reference list, the process may then pass to optional step 614, which illustrates adding HTML comments to the publisher's content regarding the removal or transcoding of the link. From step 614, the process then passes to step 616, which depicts the process becoming idle until notification of another infringing link is received.

Within the system described above, the copyright owner may initiate addition of links to the reference list maintained by the independent aggregator on the reference server, then notify publishers having infringing links. The link is initially categorized as disputed, until copyright ownership and infringement may be verified. Content publishers receiving notice of the allegation regarding the link may alter the disputed link utilizing the filter/transcode program which originally certified the link as "clear," or optionally remove it. Upon verification of copyright ownership and infringement, the categorization of the link within the reference list is altered and the copyright owner is informed of this change. The copyright owner may then again notify the publishers of content containing an infringing link, and the publishers may employ the filter/transcode program yet again to remove the infringing link from their content.

The present invention provides a mechanism for identifying and handling infringing hyperlinks within Internet content. Because an independent source for identification of infringing links is employed, publishers may reliably check their content for infringing links and thereby avoid liability for "knowingly" providing an infringing link within their content. The present invention thus provides a safe harbor for Internet content builders and publishers.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for identifying infringing or disputed links, comprising:

searching content for links;

responsive to locating a link within the content, comparing an URL from the located link with URLs within a reference list of infringing or disputed content; and responsive to identifying a match between the URL for the located link and an URL within the reference list, modifying the located link.

2. The method of claim 1, wherein the step of modifying the located link further comprises:

removing the located link from the content, or disabling the located link by deleting the URL for the located link from the content.

3. The method of claim 1, wherein the step of modifying the located link further comprises:

transcoding the located link to add a warning to the link.

4. The method of claim 1, further comprising:

responsive to identifying a match between the URL for the located link and an URL within the reference list, determining whether the URL within the reference list is categorized as infringing or disputed;

responsive to determining that the URL within the reference list is categorized as infringing, removing the located link from the content, or disabling the located link by deleting the URL for the located link from the content; and responsive to determining that the URL within the reference list is categorized as disputed, transcoding the located link to add a warning to the located link.

5. A method for testing links within content, comprising:

identifying one or more links within the content;

initiating a comparison of URLs for the one or more links within the content with URLs in a reference list of infringing or disputed links maintained by an independent aggregator; and responsive to receiving an indication of a match between an URL for a link within the content and an URL within the reference list, modifying the matching link within the content.

6. The method of claim 5, wherein the step of initiating a comparison of URLs for the one or more links within the content with URLs in a reference list of infringing or disputed links maintained by an independent aggregator further comprises:

transmitting the URLs for the one or more links within the content to a server containing the reference list.

7. The method of claim 6, further comprising:

receiving the indication of a match between an URL for a link within the content and an URL within the reference list from the server containing the reference list, wherein the indication includes an identification of a category of the URL within the reference list.

8. The method of claim 7, wherein the step of modifying the matching link within the content further comprises:

responsive to receiving the indication of a match between an URL for a link within the content and an URL within the reference list from the server, determining whether the URL within the reference list is categorized as infringing or disputed;

responsive to determining that the URL within the reference list is categorized as infringing,
   removing the matching link from the content, or
   disabling the matching link by deleting the URL for the matching link from the content; and
responsive to determining that the URL within the reference list is categorized as disputed, transcoding the matching link to add a warning to the matching link.

9. The method of claim 5, further comprising:
associating with the content a data structure including at least one of the following:
   a date on which the content was tested;
   a version of the reference list employed in testing the content;
   an electronic signature for the content which was tested;
   a listing of links within the content which were modified;
   a listing of links within the content which were not modified; or
   an authentication code for verifying testing of the content.

10. A method for certifying links, comprising:
maintaining a reference list of URLs for infringing or disputed content; and
responsive to receiving a request for clearance of a link, initiating a comparison of an URL for the link with URLs in the reference list of infringing or disputed content.

11. The method of claim 10, wherein the step of initiating a comparison of an URL for the link with URLs in the reference list of infringing or disputed content further comprises:
   transmitting the reference list to a client originating the request for clearance to enable comparison of the URL for the link with URLs in the reference list at the client.

12. The method of claim 10, wherein the step of initiating a comparison of an URL for the link with URLs in the reference list of infringing or disputed content further comprises:
   comparing the URL for the link with URLs in the reference list at a server containing the reference list.

13. The method of claim 12, further comprising:
responsive to determination of a match between the URL for the link and an URL within the reference list, transmitting a notification of the match to a client originating the request for clearance.

14. A method for eliminating infringing links within content, comprising:
   extracting an URL for an allegedly infringing link from a received notification the allegedly infringing link;
   initiating a comparison of the URL for the allegedly infringing link with URLs in a reference list of infringing or disputed links maintained by an independent aggregator; and
   responsive to receiving an indication of a match between the URL for the allegedly infringing link and an URL within the reference list, modifying the allegedly infringing link within the content.

15. A system for identifying infringing or dispute links, comprising:
   means for searching content for links;
   means, responsive to locating a link within the content, for comparing an URL from the located link with URLs within a reference list of infringing or disputed content; and
   means, responsive to identifying a match between the URL for the located link and an URL within the reference list, for modifying the located link.

16. The system of claim 15, further comprising:
means, responsive to identifying a match between the URL for the located link and an URL within the reference list, for determining whether the URL within the reference list is categorized as infringing or disputed;
means, responsive to determining that the URL within the reference list is categorized as infringing, for
   removing the located link from the content, or
   disabling the located link by deleting the URL for the located link from the content; and
means, responsive to determining that the URL within the reference list is categorized as disputed, for transcoding the located link to add a warning to the located link.

17. A system for testing links within content, comprising:
means for identifying one or more links within the content;
means for initiating a comparison of URLs for the one or more links within the content with URLs in a reference list of infringing or disputed links maintained by an independent aggregator; and
means, responsive to receiving an indication of a match between an URL for a link within the content and an URL within the reference list, for modifying the matching link within the content.

18. The system of claim 17, wherein the means for modifying the matching link within the content further comprises:
means, responsive to receiving an indication of a match between an URL for a link within the content and an URL within the reference list from a server containing the reference list, for determining whether the URL within the reference list is categorized as infringing or disputed;
means, responsive to determining that the URL within the reference list is categorized as infringing, for
   removing the matching link from the content, or
   disabling the matching link by deleting the URL for the matching link from the content; and
means, responsive to determining that the URL within the reference list is categorized as disputed, for transcoding the matching link to add a warning to the matching link.

19. The system of claim 17, further comprising:
means for associating with the content a data structure including at least one of the following:
   a date on which the content was tested;
   a version of the reference list employed in testing the content;
   an electronic signature for the content which was tested;
   a listing of links within the content which were modified;
   a listing of links within the content which were not modified; or
   an authentication code for verifying testing of the content.

20. A system for certifying links, comprising:
means for maintaining a reference list of URLs for infringing or disputed content; and
means, responsive to receiving a request for clearance of a link, for initiating a comparison of an URL for the link with URLs in the reference list of infringing or disputed content.

21. The system of claim 20, further comprising:

means, responsive to determination of a match between the URL for the link and an URL within the reference list, for transmitting a notification of the match to a client originating the request for clearance.

22. A computer program product within a computer usable medium for identifying infringing or dispute links, comprising:

instructions for searching content for links;

instructions, responsive to locating a link within the content, for comparing an URL from the located link with URLs within a reference list of infringing or disputed content; and instructions, responsive to identifying a match between the URL for the located link and an URL within the reference list, for modifying the located link.

23. The computer program product of claim 22, further comprising:

instructions, responsive to identifying a match between the URL for the located link and an URL within the reference list, for determining whether the URL within the reference list is categorized as infringing or disputed;

instructions, responsive to determining that the URL within the reference list is categorized as infringing, for removing the located link from the content, or
disabling the located link by deleting the URL for the located link from the content; and instructions, responsive to determining that the URL within the reference list is categorized as disputed, for transcoding the located link to add a warning to the located link.

24. A computer program product within a computer usable medium for testing links within content, comprising:

instructions for identifying one or more links within the content;

instructions for initiating a comparison of URLs for the one or more links within the content with URLs in a reference list of infringing or disputed links maintained by an independent aggregator; and instructions, responsive to receiving an indication of a match between an URL for a link within the content and an URL within the reference list, for modifying the matching link within the content.

25. The computer program product of claim 24, wherein the instructions for modifying the matching link within the content further comprises:

instructions, responsive to receiving an indication of a match between an URL for a link within the content and an URL within the reference list from a server containing the reference list, for determining whether the URL within the reference list is categorized as infringing or disputed;

instructions, responsive to determining that the URL within the reference list is categorized as infringing, for removing the matching link from the content, or
disabling the matching link by deleting the URL for the matching link from the content; and instructions, responsive to determining that the URL within the reference list is categorized as disputed, for transcoding the matching link to add a warning to the matching link.

26. The computer program product of claim 24, further comprising:

instructions for associating with the content a data structure including at least one of the following:

a date on which the content was tested;

a version of the reference list employed in testing the content;

an electronic signature for the content which was tested;

a listing of links within the content which were modified;

a listing of links within the content which were not modified; or an authentication code for verifying testing of the content.

27. A computer program product within a computer usable medium for certifying links, comprising:

instructions for maintaining a reference list of URLs for infringing or disputed content; and instructions, responsive to receiving a request for clearance of a link, for initiating a comparison of an URL for the link with URLs in the reference list of infringing or disputed content.

28. The computer program product of claim 27, further comprising:

instructions, responsive to determination of a match between the URL for the link and an URL within the reference list, for transmitting a notification of the match to a client originating the request for clearance.

* * * * *